US010678285B2

(12) United States Patent
Van Gorp et al.

(10) Patent No.: US 10,678,285 B2
(45) Date of Patent: Jun. 9, 2020

(54) SYSTEMS AND METHODS OF MONITORING BRIDGING TIME

(71) Applicant: SCHNEIDER ELECTRIC USA, INC., Palatine, IL (US)

(72) Inventors: John C. Van Gorp, Sidney (CA); John Eggink, Brentwood, TN (US)

(73) Assignee: SCHNEIDER ELECTRIC USA, INC., Boston, MA (US)

( * ) Notice: Subject to any disclaimer, the term of this patent is extended or adjusted under 35 U.S.C. 154(b) by 836 days.

(21) Appl. No.: 14/655,978

(22) PCT Filed: Dec. 27, 2012

(86) PCT No.: PCT/US2012/071757
§ 371 (c)(1),
(2) Date: Jun. 26, 2015

(87) PCT Pub. No.: WO2014/105016
PCT Pub. Date: Jul. 3, 2014

(65) Prior Publication Data
US 2015/0331437 A1 Nov. 19, 2015

(51) Int. Cl.
*G05F 1/66* (2006.01)
*G05B 15/02* (2006.01)
(Continued)

(52) U.S. Cl.
CPC ............... *G05F 1/66* (2013.01); *G05B 15/02* (2013.01); *H02J 9/06* (2013.01); *H04L 43/0817* (2013.01); *Y04S 40/168* (2013.01)

(58) Field of Classification Search
CPC .......... H02J 2003/001; H02J 3/38; H02J 9/04; H02J 9/06; G05F 1/569; G05F 1/565;
(Continued)

(56) References Cited

U.S. PATENT DOCUMENTS 6,404,075 B1 * 6/2002 Potter ..................... H02J 9/06
307/64
2004/0148934 A1 8/2004 Pinkerton et al.
(Continued)

OTHER PUBLICATIONS

Notification of Transmittal of the International Search Report and the Written Opinion of the International Searching Authority from corresponding PCT/US2012/071757 dated Mar. 5, 2013.

*Primary Examiner* — Anthan Tran
(74) *Attorney, Agent, or Firm* — Lando & Anastasi, LLP

(57) ABSTRACT

According to one aspect, embodiments described herein provide a system and a method for managing an electrical distribution system for a facility having at least one load. In one example, the method comprises receiving data related to transfer performance of a plurality of energy sources in the electrical distribution system, the plurality of energy sources including a first energy source and a second energy source, converting the data into transfer parameter values, receiving predefined transfer performance indicators related to the plurality of energy sources in the electrical distribution system, comparing the transfer parameter values with predefined transfer performance indicators to produce a comparison result assessing transfer performance of the plurality of energy sources, and managing transfer of the at least one load between the first energy source and the second energy source based on the comparison result.

12 Claims, 7 Drawing Sheets

(51) Int. Cl.
*H02J 9/06* (2006.01)
*H04L 12/26* (2006.01)

(58) Field of Classification Search
CPC ... G05F 1/577; G05F 1/66; G05F 5/00; G05B 9/02; G05B 9/03; G05B 15/02
USPC ........................................................ 702/109
See application file for complete search history.

(56) References Cited

U.S. PATENT DOCUMENTS

| | | | | |
|---|---|---|---|---|
| 2005/0278075 | A1* | 12/2005 | Rasmussen | H02J 9/06 700/286 |
| 2006/0263656 | A1* | 11/2006 | Johnson | H01M 8/04089 429/425 |
| 2009/0284072 | A1* | 11/2009 | Everett | H02J 3/14 307/23 |
| 2011/0278934 | A1 | 11/2011 | Ghosh et al. | |
| 2012/0105097 | A1 | 5/2012 | Hancock et al. | |
| 2014/0001861 | A1* | 1/2014 | Mann | G06F 1/30 307/66 |
| 2014/0167809 | A1* | 6/2014 | Sebald | G01R 31/42 324/764.01 |

* cited by examiner

SYSTEMS AND METHODS OF MONITORING BRIDGING TIME

This application is a U.S. National Stage Application under 35 U.S.C. § 371 of International Application No. PCT/US2012/071757, filed Dec. 27, 2012, which is hereby incorporated by reference in its entirety for all purposes.

BACKGROUND

1. Field of Invention

Embodiments of the present invention relate generally to management of bridging energy sources. More specifically, at least one embodiment relates to management of bridging energy sources based on bridging time.

2. Discussion of Related Art

Centralized data centers for computer, communications and other electronic equipment have been in use for a number of years. More recently, with the increasing use of the Internet, large scale data centers that provide hosting services for Internet service providers ("ISPs"), application service providers ("ASPs") and Internet content providers are becoming increasingly popular. Typical centralized data centers contain numerous racks of equipment that require power, cooling and connections to communication facilities.

In general, centralized data centers have a power distribution system configured to avoid power outages because the data centers include a high percentage of critical loads without which an enterprise may be unable to operate. Often, an uninterruptable power supply ("UPS") is employed in the power distribution system to ensure that equipment receives continuous power and avoids any power outages. Typical power distribution systems include racks of equipment, for example, servers and the like that are located in the data center.

SUMMARY

The monthly testing of generators in data centers and critical power applications test different parts of the system separately with no automatic check on whether the entire system functions as needed. According to various aspects, a system and method disclosed herein captures time and load information from all relevant power distribution equipment from generators to uninterruptable power supplies (UPS), power distribution units (PDU), and computer room air conditioner (CRAC) equipment and provides a complete verification of the system after a test. The system and method disclosed further provides real time status updates as a result of a marginal or failed test state. In addition, the system and method can be used to comply with regulations mandated by legislative bodies. For example, as more medical records are housed in off-site data centers, the systems and methods according to the embodiments described can be used to insure that servers hosting the medical records meet the legislated emergency power system standards required for hospitals.

According to one aspect, a method for managing an electrical distribution system for a facility having at least one load is disclosed. In one example, the method comprises receiving, at a computer system connected to a monitoring system, data related to transfer performance of a plurality of energy sources in the electrical distribution system, the plurality of energy sources including a first energy source and a second energy source, using the computer system, converting the data into transfer parameter values, receiving, at the computer system, predefined transfer performance indicators related to the plurality of energy sources in the electrical distribution system, using the computer system, comparing the transfer parameter values with predefined transfer performance indicators to produce a comparison result assessing transfer performance of the plurality of energy sources, and managing transfer of the at least one load between the first energy source and the second energy source based on the comparison result.

In the method, receiving data may further comprise receiving data relating to the plurality of energy sources including at least one of at least one bridging energy source, at least one primary energy source, and at least one backup energy source. In one example, converting the data includes converting the data into the transfer parameter values including at least one of energy capacity value, status of the energy sources, remaining run time, total transfer time, safety margin time, recharge time and power draw value of loads. In addition, receiving may further include receiving the predefined transfer performance indicators including at least one of nominal run times under different loads, and historical measured performance values.

In one example, the method may further comprise determining a start and an end of transfer criteria for the first energy source and the second energy source. In addition, the method may further comprise transmitting one of a begin test signal and an end test signal to one of the first energy source and the second energy source. In various examples, the method may further comprise configuring the monitoring system to monitor data related to electrical and status parameters of components in the electrical distribution system.

In the method, receiving data may further include receiving data relating to a plurality of uninterruptable power supplies disposed in parallel with the at least one load, including a first uninterruptable power supply having a first run time and a second uninterruptable power supply having a second run time. In one example, the method may further comprise determining a redundancy level for the plurality of uninterruptable power supplies, comparing the determined level of redundancy to a selected level of redundancy, and determining an impact on a run time capacity of the plurality of energy sources. In various examples, the method may further comprise iteratively calculating remaining run time capacity for the plurality of uninterruptable power supplies, upon indication that a run time capacity of the first uninterruptable power supply is exhausted.

According to another aspect, a system for managing an electrical distribution system in a facility having at least one load is disclosed. In one example, the system comprises a monitoring system having a plurality of electrical monitors coupled to a plurality of energy sources associated with the electrical distribution system, the plurality of energy sources including a first energy source and a second energy source, and a controller coupled to the monitoring system. The monitoring system may be configured to receive data related to transfer performance of the plurality of energy sources in the electrical distribution system, convert the data into transfer parameter values, receive predefined transfer performance indicators related to the plurality of energy sources in the electrical distribution system, compare the transfer parameter values with predefined transfer performance indicators to produce a comparison result assessing transfer performance of the plurality of energy sources, and manage transfer of the at least one load between the first energy source and the second energy source based on the comparison result.

In one example, the plurality of energy sources includes at least one of at least one bridging energy source, at least one primary energy source, and at least one backup energy source. In the system, the transfer parameter values may include at least one of energy capacity value, status of the energy sources, remaining run time, total transfer time, safety margin time, recharge time and power draw value of loads. In some examples, the predefined transfer performance indicators may include at least one of nominal run times under different loads, and historical measured performance values.

In various examples, the controller is further configured to determine a start and an end of transfer criteria for the first energy source and the second energy source. The controller may be further configured to transmit one of a begin test signal and an end test signal to one of the first energy source and the second energy source. The plurality of energy sources may further includes a plurality of uninterruptable power supplies disposed in parallel with the at least one load, including a first uninterruptable power supply having a first run time and a second uninterruptable power supply having a second run time. The first time may be different than the second time. The controller may be further configured to determine a redundancy level for the plurality of uninterruptable power supplies, compare the determined level of redundancy to a selected level of redundancy, and determine an impact on a run time capacity of the plurality of energy sources.

In the system, the controller may be further configured to iteratively calculate remaining run time capacity for the plurality of uninterruptable power supplies, upon indication that a run time capacity of the first uninterruptable power supply is exhausted.

According to another aspect, a non-transitory computer readable medium having stored thereon sequences of instruction including instructions that will cause a processor to receive from a monitoring system, data related to transfer performance of a plurality of energy sources in the electrical distribution system, the plurality of energy sources including a first energy source and a second energy source, convert the data into transfer parameter values, receive predefined transfer performance indicators related to the plurality of energy sources in the electrical distribution system, compare the transfer parameter values with predefined transfer performance indicators to produce a comparison result assessing transfer performance of the plurality of energy sources, and manage transfer of at least one load between the first energy source and the second energy source based on the comparison result.

In one example, the plurality of energy sources further includes a plurality of uninterruptable power supplies disposed in parallel with the at least one load. In addition, the sequences of instruction include instructions that will cause a processor to determine a redundancy level for the plurality of uninterruptable power supplies, compare the determined level of redundancy to a selected level of redundancy; and determine an impact on a run time capacity of the plurality of energy sources.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
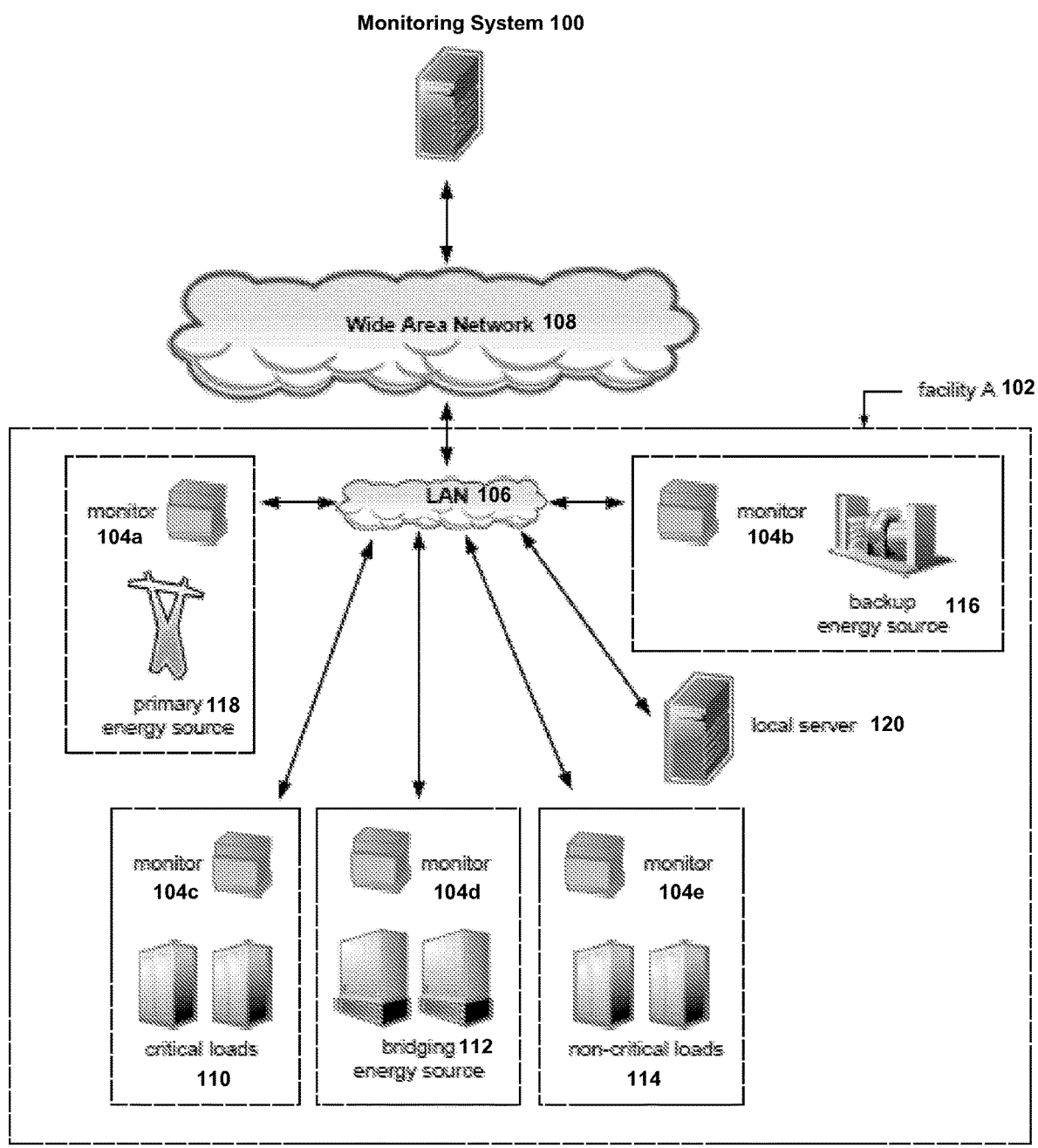
FIG. 1 is a schematic diagram of one example of a distributed system including a monitoring system for a facility in accordance with one embodiment.

The systems and methods described herein, according to embodiments, provide for monitoring and calculating the amount of bridging time available from bridging energy sources. According to some examples, bridging energy sources are designed to carry some or all facility load when switching between primary and backup energy sources. For example, a bridging energy source can provide uninterrupted power to critical loads while switching from a utility energy source to a diesel generator as a result of a power loss. The amount of time a bridging energy source can carry facility load depends on a number of factors, including the amount of energy currently stored in the bridging energy source and current load levels and activities. Bridging energy sources can include, in one example, UPS systems, capacitors, and flywheels.

The run time duration of the bridging energy sources depends heavily on the power demand of critical loads during this transfer. According to embodiments disclosed here, a monitoring system connected to the primary, secondary and bridging energy sources can be configured to capture values of several parameters during the transfer between primary and backup energy sources. The captured values can be used to assess the performance of energy source transfers over time and assist in identifying potential failures in advance.

Currently available bridging systems are configured to work within set legislated time parameters. In other words, these systems are configured to have the generator and the transfer switch operate within a defined time interval (for example 10 seconds). This approach is not necessarily relevant in a data center where legislative time parameters are not applicable or where energy sources may have energy capacity beyond the legislated time parameters.

In some facilities, the bridging system may not have sufficient energy reserves to carry the load through the defined time period, which can be noted as a "fail" of the bridging system. In other facilities, the bridging system may pass the 10 second bridging test but nevertheless have bridging problems. For example, the bridging system may have the reserves to carry the system for much longer than the defined 10 seconds period, in which case the results of a bridging test may indicate a "passed" test. However, it is not unusual for a data center generator to take up to 30 seconds to fully warm up and for a UPS to be required to carry the load for more than a few minutes while the generator is warming-up resulting in "fail" of the bridging system.

Typical facility monitoring systems may not recognize that a UPS is present in the system, nor do these systems test the UPS and include the UPS test parameters in the test report. Furthermore, these monitoring systems may not calculate the bridging time, the actual, average, min and max difference between the UPS carry time and the generator start time, and display that bridging time in the test reports. These systems may further fail to monitor, measure, or calculate the real time UPS battery back-up time remaining and use this information in the generator test procedure. Instead, under the management of these systems, the UPS battery back-up time remaining varies with load and UPS status. Unlike the presently described monitoring system, conventional known systems do not use calculated bridging time for alarming to validate that the emergency power system will function correctly.

Typical facility tests are generally intended for purposes of compliance and therefore do not use the backup systems to their maximum capacity. In some examples these compliance tests include a data center load test, an optional life safety test, such as for fire alarm and critical systems, and a hospital legislated compliance test for data centers with medical records. Some facility monitoring systems may require the user to manually determine if it is a safe or prudent time to start the generator test. Once enabled by the user, these systems read the UPS and PDU values and recommend against starting a test if there is a UPS in bypass mode, a UPS with low battery conditions, or other fault and alarm conditions within the UPS, PDU, switchgear, or generator system.

In addition, conventional facility monitoring systems are limited in the types of test performed and the parameters tested by the system. For example, at least one conventional facility monitoring system tests only the generators and the Automatic Transfer Switches (ATS), which are circuit breaker or contact based, not solid state static transfer switches in the PDUs. Further, such conventional systems do not incorporate a full system model, including HVAC loading parameters, into the test.

The aspects disclosed herein in accordance with the present embodiments, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment of the present invention, a computer system is configured to perform any of the functions described herein, including but not limited to, configuring, modeling and presenting information regarding specific data center configurations. Further, computer systems in embodiments may be used to automatically measure environmental parameters in a data center, and control equipment, such as chillers or coolers to optimize performance. Moreover, the systems described herein may be configured to include or exclude any of the functions discussed herein. Thus the embodiments are not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

FIG. 1 illustrates distributed system including a monitoring system 100 for a facility 102 (labeled "Facility A") according to some embodiments. The monitoring system 100 may include monitoring devices 104 disposed in the facility 102, which may include one or more critical loads 110, one or more bridging energy sources 112, one or more non-critical loads 114, one or more backup energy sources 116, one or more primary energy sources 118 and a local server 120. According to one example, the monitoring system 100 may be a remote monitoring system and may be connected to a LAN 106 (Local Area Network) disposed at the facility 102, with the facility LAN 106 and the monitoring service 100 connected via a WAN 108 (Wide Area Network). Each of the monitoring devices 104 within facility 102 monitors one or more parameters of one or more energy sources or loads and communicates parameter values to a local server 120 via the facility LAN. In an alternative example, the monitoring system 100 may be a local monitoring system and may be disposed within the facility 102.

The facility 102, in one example, is powered by either a primary energy source 118 or a backup energy source. The primary energy source 118 powers both critical and non-critical loads located within facility 102 and may include an electric utility. Critical and non-critical loads may be based on the types of facilities monitored. For example, in a hospital facility, the critical loads may be those supplying power for high priority applications such as life-sustaining equipment such as ventilators. In a data center facility, critical loads may be those supplying power to high priority equipment such as servers operating high priority applications and the associated coolers needs to support the high priority servers. Non-critical loads may include non-emergency or non-essential loads, such as non-emergency lights and elevators.

When the primary energy source is not available, the backup energy source may power at least the critical loads. In some examples, the backup energy sources may also power a combination of both critical and non-critical loads. Backup energy sources 116 can include one or more generators powered by diesel, natural gas, or other fuels. Backup energy sources 116 can also include alternative fuel sources such as solar or wind sources. The bridging energy source 112 provides power to at least critical loads during a switch between the primary and backup energy sources. Bridging energy sources 112 can include a static or a rotary UPS, capacitors, and flywheels.

According to various examples, the monitoring devices 104 within facility 102 monitor one or more parameters of one or more energy sources or loads. The parameter values may be communicated to a local server 120 via the facility LAN 106. In one example, the monitoring devices 104 may communicate parameter values to the remote monitoring system 100 via the WAN network 108. The monitoring system 100 may transfer and receive information from any type of communications network.

The parameters monitored by the monitoring devices 104 can include information pertaining to the primary and backup energy sources, for example, the power output and status of the primary energy source, and the backup energy source. In some examples, the parameters may include information pertaining to the bridging energy source, such as the energy capacity, status, and remaining run time of the bridging energy source. In other examples, the parameters can include information pertaining to critical and non-critical loads, such as the power draw and status of both critical and non-critical loads. In at least one example, the parameters monitored by the monitoring device 104 may include the total time required to transfer between primary and backup energy sources.

The monitoring devices 104 can be any intelligent electronic device, such as a power meter, a relay, a PLC, or any other device. When used to measure a characteristic of power, the monitoring devices 104 are configured to measure a characteristic of power such as, for example, current and/or voltage or any advanced waveform information. In some examples, the monitoring devices 104 can further transform the measured characteristic into corresponding electrical parameter data. In other examples, the monitoring devices 104 can communicate the measured characteristics to the local server 120 via the LAN and/or to the monitoring system 100 WAN for either the local server 120 or the monitoring system 100 to transform the measure characteristic into corresponding electrical parameter data. In some examples, the monitoring device, the local server 120 and/or the monitoring system 100 can store the electrical parameter data.

The parameters captured by the monitoring devices 104 may include electrical parameters such as voltage (V), current (A), power (kW, kVA) and energy (kWh). The parameters captured by the monitoring devices 104 may be status parameters, and may further include the operational status of critical and non-critical loads (such as ON or OFF, or the current operating mode of the load) as well as the operational status of energy sources 112, 116, and 118 (such as ONLINE or OFFLINE). In addition, the parameters may include the current energy capacity of the bridging energy source 112, which may be measured in terms of remaining percent of total capacity. Additional parameters may include the remaining run time of the bridging energy source 112, which may be measured in units of time such as minutes.

The monitoring system 100 may receive and store updates of these parameters and keep a historical record of past values. The monitoring system 100 may store related technical specifications for equipment in the power system, such as nominal run times under different loads for a specific UPS. One or more transfer performance indicators are defined and used to track the time required to transfer between primary 118 and backup energy sources 116. Transfers between energy sources, for example between primary and secondary energy sources and back to the primary sources, may be tested on a regular basis according to the embodiments described herein. A description of test protocols for buildings with critical power systems is described in U.S. patent application Ser. No. 12/917,581, filed on Nov. 2, 2010, titled "Automated Emergency Power Supply System (EPSS) Test Reporting Criticality of EPSS Test Failure," which is assigned to the assignee of the present application, and is hereby incorporated herein by reference in its entirety.

Figure 2:
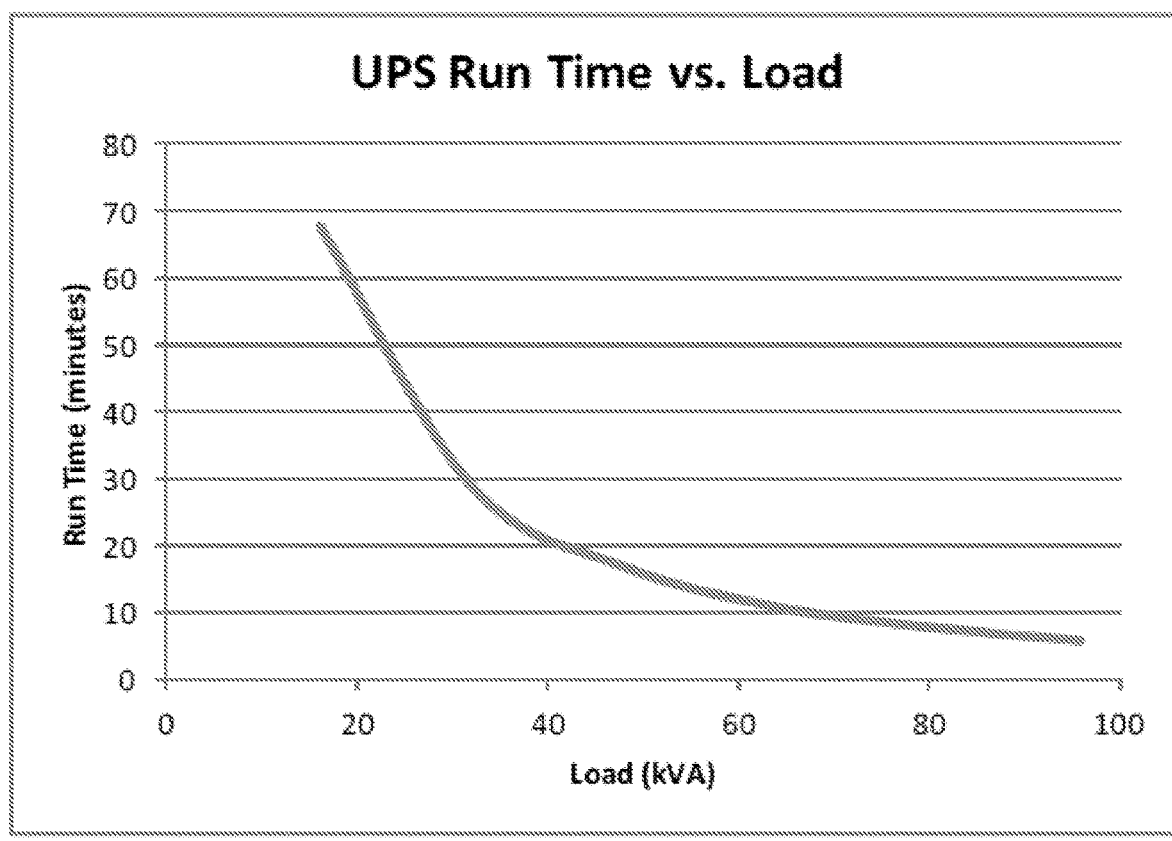
FIG. 2 is a graph of one example of the relationship between run time and load for a UPS.

The bridging energy source 112 plays an important role in providing uninterrupted power to critical loads during a transfer between the primary and backup energy sources, but the run time duration of the bridging energy source depends heavily on the power demand of critical loads 114 during this transfer. FIG. 2 illustrates one example of the relationship between run time and load. The UPS runtime in minutes versus load in kVA is displayed for a UPS unit with a rated output of 96 kW, drawn from the APC Symmetra PX 96. Table 1 provides values for several of the points on the curve shown in FIG. 2.

TABLE 1

UPS Run Time vs. Load

| Load (kVA) | 16 | 32 | 48 | 64 | 80 | 96 |
|---|---|---|---|---|---|---|
| Run Time (minutes) | 68 | 29 | 17 | 11 | 8 | 6 |

As can be seen by the values in Table 1 and the curve in FIG. 2, the run time of the UPS drops dramatically as the load on the UPS increases. In this example, when operating at one-sixth of its rated output, the UPS can provide 68 minutes of run time, but the run time drops to just 6 minutes when the UPS is operating at its rated output. Critical loads can suffer an interruption in power flow if the total run time of the bridging energy source 112 becomes less than the time required to bring backup energy sources online and transfer critical loads 110 over to those backup energy sources 116.

The power draw of both critical and non-critical loads may also vary or change based on various protocols. Loads may change both before and during transfer. For example, on power loss detection, one or more loads may be shed to increase the run time associated with both the bridging sources and backup energy sources and to have the bridging sources comply with desired total run time. The monitoring system may assign different priorities to determine whether the loads may be shed before or during transfer. The different priority levels can include a low priority level associated with non-critical electrical equipment, a medium priority level associated with for example, safety electrical equipment, and a high priority level associated with critical electrical equipment.

Figure 3:
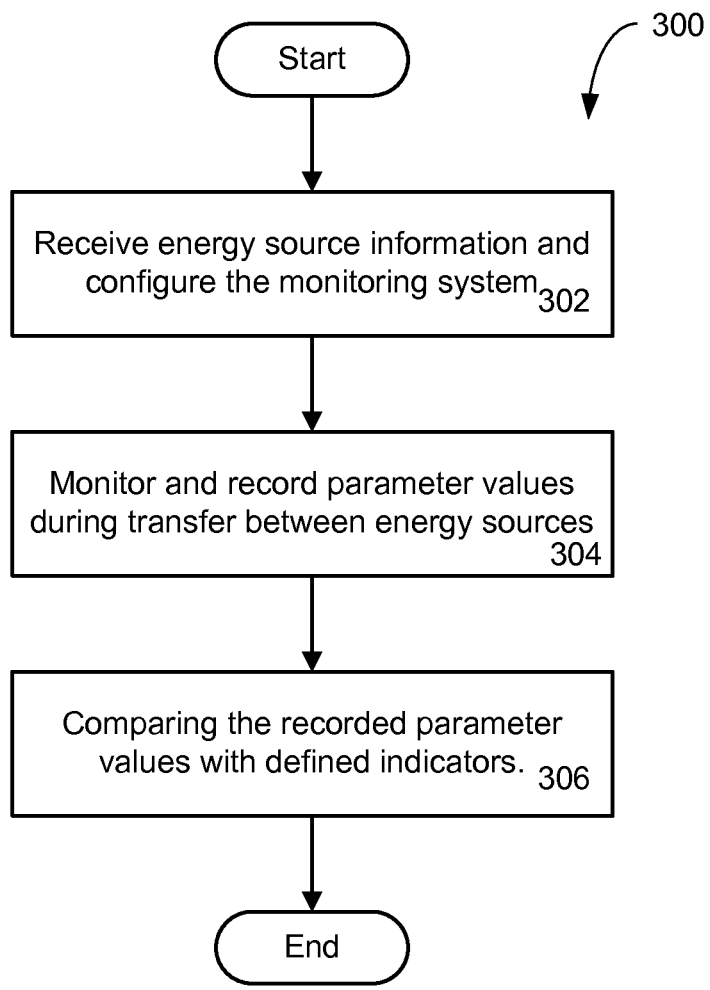
FIG. 3 is a flow diagram of one example process of determining bridging time in accordance with one embodiment.

According to various embodiments, the monitoring system 100 via the monitoring devices 104 is configured to capture the values of several parameters during a transfer between primary and backup energy sources. The transfer parameters monitored and recorded can be used to manage the transfer of critical 114 and non-critical loads 110 between primary and backup energy sources. These monitoring transfer values can then be used to assess the performance of energy source transfers over time and assist in identifying potential failures in advance. One example of a method of monitoring and storing information pertaining to the energy source transfer and assessment of transfer performance is described in method 300, shown in FIG. 3.

The method 300 includes configuring a monitoring system, such as the monitoring system 100, capturing parameter values during a transfer and comparing the captured parameter values against defined transfer performance indicators. In act 302, monitoring devices are configured to capture electrical and status parameters for energy sources, loads, and transfer equipment involved in transferring between primary and backup energy sources. The monitoring system is also configured with one or more transfer performance indicators, such as the acceptable range of bridging energy source remaining run time.

In one example, the monitoring system 100 is configured to capture the energy source, load, and transfer equipment data required to later assess the performance of each energy source transfer against defined transfer performance indicators. In one implementation, the local server at a facility may be configured to acquire data from facility monitoring devices and assess transfer performance. In another implementation, a remote monitoring system may perform all of the necessary data acquisition and assessment tasks, or these tasks may be split between the local server 120 and the monitoring system 100.

In act 304, the monitoring devices 104 can monitor and record parameter values during a transfer between energy sources for example during the transfer between the primary and backup energy sources. In some examples, the monitoring devices 104 can monitor and record transfer parameter values during both planned and unplanned transfers.

Table 2 outlines criteria that may be used to determine the start and end of a transfer, for both primary-to-backup and backup-to-primary transfer scenarios in the case of both planned and unplanned events.

TABLE 2

Transfer Scenarios and Start/End Criteria

|  |  | Planned | | Unplanned | |
|---|---|---|---|---|---|
|  |  | Primary to Backup | Backup to Primary | Primary to Backup | Backup to Primary |
| Start | Begin test signal | X | | | |
|  | Loss of primary energy source detected | | | X | |
|  | Transfer switch operation initiated | X | X | X | X |
| End | End test signal | | X | | |
|  | Transfer switch operation complete | X | X | X | X |

In some examples, different start of transfer and end of transfer criteria may be applied to determine the duration of the transfer. For example, whether or not the transfer was initiated as part of a test, or whether the transfer is from a primary source to a backup energy source (or vice versa) can determine different durations of the transfer. During planned transfers, the monitoring system transmits a begin test signal to start testing and an end test signal to end testing. During unplanned transfers, the monitoring system can detect a loss of primary energy source and use that time as the star of transfer criteria.

In some examples, the planned test can include testing the start up and operation of backup energy sources, as well as a black start test. The black start test can include disconnecting the primary energy source to test all transfer components, bridging energy sources and backup energy sources equipment under real conditions. The monitoring system can support multiple start/stop criteria definitions for tracking transfers between primary and backup systems. For example, one set of criteria may be used for testing backup energy sources, and another set of criteria may be used when the primary energy source unexpectedly goes offline. The monitoring system may store the criteria used to mark the start and end of a transfer when capturing and storing data. In one example, this criteria information may be stored on the local server 120. In other examples, the criteria information may be stored remotely in the database of the monitoring server 100.

In act 306, the monitoring system can compare the recorded parameter values against defined transfer performance indicators. The performance indicators may include the total time required to transfer between primary and backup energy sources, and the remaining run time of the bridging energy source after the transfer is complete. The parameter values may include those captured during a transfer between primary and backup energy sources.

The performance indicator values may be based on nominal values from technical specifications for the equipment involved. In other examples, the performance indicator values may be summary values derived from a number of past measured values. One example of a transfer performance indicator includes the remaining run time of the bridging energy source after a transfer is complete. Acceptable values for this performance indicator may be defined as a single range, such as >X minutes. In addition, the indicators may be defined in multiple ranges, such as a warning range where transfer time T>Y minutes but T<X minutes, and a pass range where T>X minutes. Alternately, acceptable values in this example may be defined more generally in terms of the percentage of available run time remaining after a transfer is complete.

As a result of the comparison, the monitoring system can produce a report indicating a performance of the bridging source. For example, the monitoring system may provide the bridging time as the actual, average, min and max difference between the UPS carry time and the generator start time, display that bridging time and generate test reports. The monitoring system can then monitor, measure, or calculate the real time UPS battery back-up time remaining and use this information in the generator test procedure. In addition, the calculated bridging time can be used for alarming purposes, providing a pass, warning, or fail indicator and to further validate that the emergency power system functions correctly.

All captured and calculated data can be stored by the monitoring system and can be further analyzed at a later time. As an example, all stored measurement parameter and transfer performance indicator values for a predefined historical time period could be printed out as a report. Alternately, a summary of these values may be generated, where the summary may include minimum, maximum, and mean values for each parameter.

More sophisticated statistical summaries may be generated for historical parameter values, including the variance, standard deviation, and quartiles for a set of values. Such summary values may also be used in transfer performance assessments. Rather than compare measured values against technical specifications, for example, measured values may instead be compared to a summary of past measured values. As an example, the UPS run time remaining after a transfer might be compared to the mean of a set of 10 remaining run time values captured in the past. Alternately, the run time remaining after a transfer might be checked to ensure it is within one standard deviation of a set of 50 remaining run time values captured in the past.

In one embodiment, the monitoring system may be configured to provide a warning when it determines that the bridging energy source has insufficient energy stored to successfully complete a transfer, or if a transfer would exceed a defined transfer time safety margin performance indicator. The monitoring system may also provide some indication of when a bridging energy source is able to support a transfer without exceeding defined transfer performance characteristics. In one example, the monitoring system may estimate this recommended time delay based on technical specifications for the bridging energy source equipment, or based on some aggregate measure of past recharging times.

One implementation of the method 300, according to one embodiment, is now described. In act 302, the monitoring system 100 can be configured to monitor and record a number of measurement parameters, including the power output (in kW) and ONLINE/OFFLINE status of the primary energy source, the power output (in kW) and the and ONLINE/OFFLINE status of the backup energy source, the energy capacity (in percent of total available capacity), the status (ONLINE/OFFLINE), and the remaining run time (in minutes) of the bridging energy source, the power demand (in kW) and status (ON/OFF) of both critical and non-critical loads, and the total time (in minutes) needed to transfer between primary and backup energy sources.

The monitoring system 100 can be further configured to monitor and record transfer performance indicators including the remaining run time performance indicator for the bridging energy source equipment, to assess the performance of this equipment against expectations. The monitoring system 100 can be configured to monitor and record a transfer time safety margin performance indicator that includes a safety margin amount of time for bringing the backup energy source online, specified in terms of the remaining run time of the bridging energy source once the transfer is complete.

In act 304, for planned tests of a transfer from the primary to backup energy source, the monitoring system is configured to use a "begin test" signal to mark the beginning of a transfer and a "transfer switch operation complete" signal to mark the end of the transfer. When the transfer begins, the monitoring system 100 can capture the measurement parameters listed above, and note the energy capacity and remaining run time of the bridging energy source at the end of the transfer.

In this example, only critical loads are assumed to be carried by the bridging energy source during transfer. All of these loads may be turned ON and represented to have a power demand of 96 kW. The bridging energy source, in this example, is the UPS with the run time performance illustrated in Table 1. In this example, the UPS can provide this output for up to 6 minutes after the transfer is initiated, assuming the total transfer time is 4 minutes, and the UPS has the 2 minutes of remaining run time expected from its technical specification. Further, the transfer time safety margin performance indicator, in this example, needs the bridging energy source to have at least 3 minutes of run time remaining once a transfer is complete.

In act 306, the monitoring system compares the recorded parameter values listed above with the defined indicators. As the result of that comparison, the following transfer performance assessments can be made. First, in this example, a PASS assessment is made on the remaining run time performance indicator because the time remaining on the UPS matches the time associated with the technical specifications. Second, a WARNING assessment is made on the transfer time safety margin performance indicator because while the 2 minutes of run time remaining matches the UPS technical specifications, this remaining time falls short of the 3-minute minimum value of the transfer time safety margin.

According to additional embodiments, the charging capacity of the bridging energy source may be an important consideration in the time delay that should be observed during transfers between primary and backup energy sources. As an example, after one transfer has been complete, it may take some time for the bridging energy source to recharge to the point where it can successfully carry critical loads through another transfer. Therefore, the bridging energy source equipment parameters that may be tracked in act 304 can include (a) percent of full charge; and (b) remaining run time.

According to another embodiment, the monitoring system can also determine the relationship between power system redundancy and run time capacity of bridging energy sources. The bridging energy source equipment, such as one or more UPS units disposed in the facility, may be combined in parallel operation to deliver a specified level of redundancy. The monitoring system can determine the current level of redundancy and compare the current level to the specified level of redundancy. However, the parallel configuration may have an impact on the run time capacity of the bridging energy source as a whole.

Figure 4:
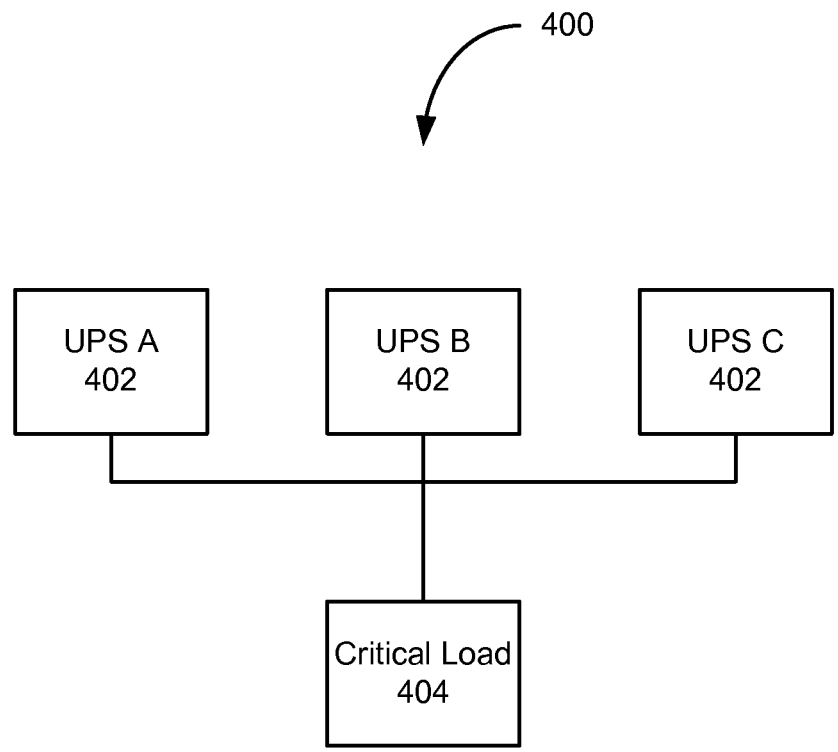
FIG. 4 is a schematic diagram of one example of UPS systems disposed in parallel with a critical load.

FIG. 4 illustrates one example of a parallel arrangement 400 of multiple UPS 402A-C units providing bridging energy to a critical load 404. The UPS units 402A-C provide the energy required by the critical load 404, but the capacity for power delivery of these UPS units can impact the redundancy that the parallel arrangement of UPS units can provide.

In one example, each of the UPS units 402 has the run time capability specified by the curve of FIG. 2 and associated Table 1, and each is capable of maximum power output of 96 kW. In this example, the critical load has a current power demand of 150 kW. With UPS units 402A-C operating, each can share ⅓ of the total load, or 50 kW each. This loading level is near the 48 kW level shown in Table 1, so each UPS will have a run time of slightly less than the 17 minutes shown, which is the aggregate run time of the parallel combination of the units 402A-C. If the UPS 402A unit fails, the UPS units 402B and 402C split the additional load previously carried by the failed unit. Each of the two remaining units 402B and 402C now carries 75 kW of the critical load. This output is near the 80 kW level shown in Table 1, bringing the run time down to a little more than 8 minutes for each unit. This is the same value for the parallel combination of the remaining 2 units. When all three UPS units 402A-402C are operating, the total run time available is almost 17 minutes, but only for a redundancy level of N. Only two UPS units are required to carry the 150 kW demand of the critical load, which translates to an improved redundancy level of N+1, but at the cost of a reduced run time of slightly more than 8 minutes.

According to some embodiments, parallel combinations of UPS units can typically use units of a similar make and model, and with the same rated power output. Even when operating under similar conditions, however, similar UPS units may differ slightly in energy storage capacity, and the run time of similar units within a parallel combination may not be exactly the same. When estimating the remaining run time for a parallel combination of UPS units with differing remaining run times, the monitoring system 100 may compensate for varying run time in a number of ways.

In one example, the monitoring system 100 may use the shortest remaining run time reported by the UPS units in a parallel combination. Using this method, the remaining UPS units may have some remaining capacity once the unit with the shortest run time exhausts its capacity. This method is a conservative approach and may not account for how the remaining capacity can be efficiently used.

Figure 5:
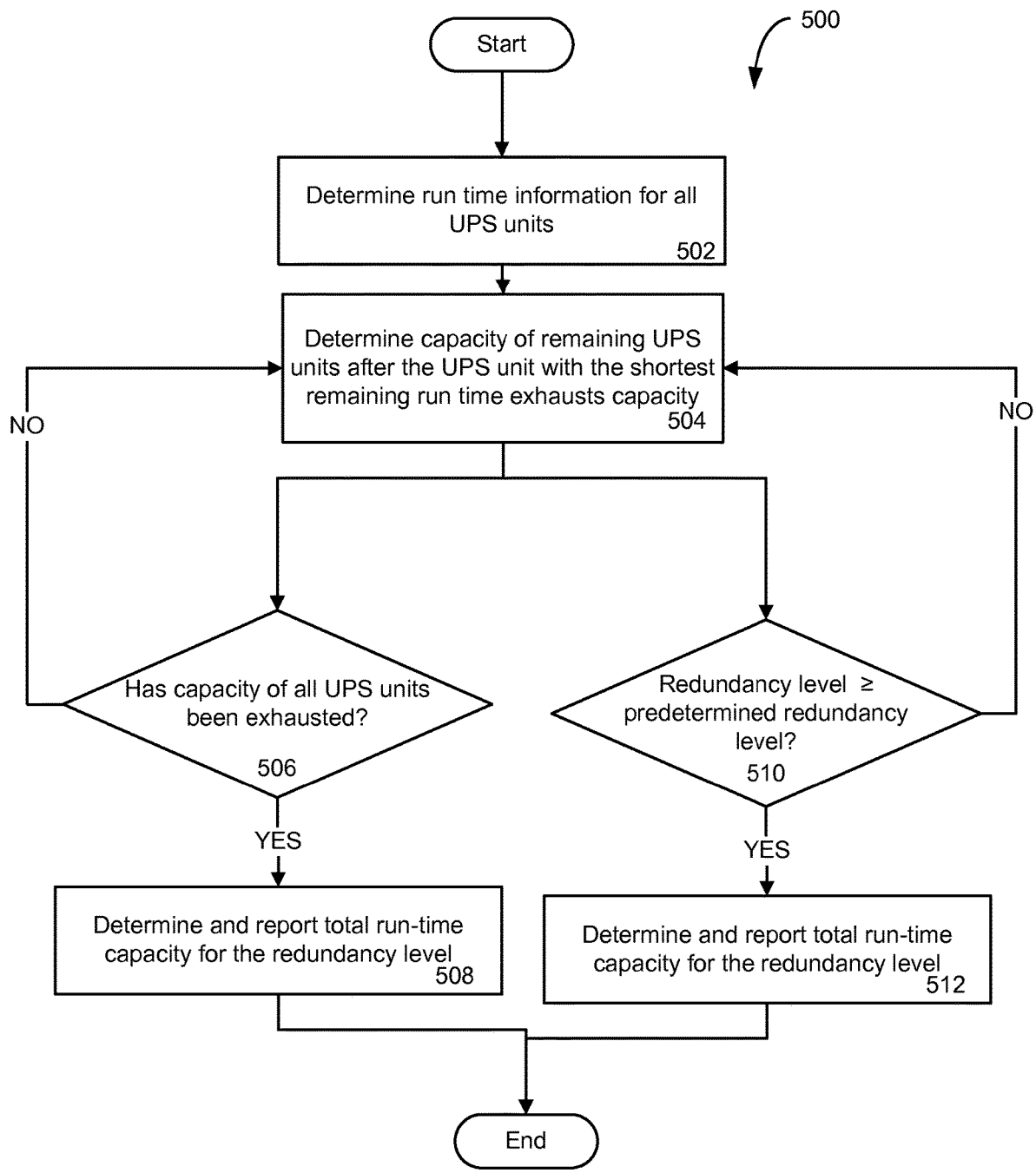
FIG. 5 is a flow diagram of one example of a process of determining run time information for parallel UPS systems.

FIG. 5 describes a method 500 of continuously calculating the maximum run time available from the parallel combination of UPS units with differing remaining run times. The method 500 starts at act 502, with the monitoring system receiving information for all UPS units connected in parallel and determining run time capacity information associated with those UPS units. In act 504, the monitoring system 100 can determine the capacity remaining after UPS unit with the shortest remaining run time has exhausted its capacity. In act 506, the monitoring system 100 can iteratively determine the capacity of the remaining UPS units when the unit with the shortest remaining run time exhausts its capacity until the capacity of all UPS units has been exhausted. Alternatively, in act 510, the monitoring system 100 can be configured to stop the iteration once a particular predetermined level of redundancy is reached.

Using the parallel UPS example described above with reference to FIGS. 4 and 5, the monitoring system 100 can calculate the maximum remaining run time for a parallel combination of UPS systems, each UPS system having differing remaining run times. In this example, each UPS is carrying a load of 50 kW, as before, but while UPS 402A and UPS 402B have a remaining run time of 15 minutes, the UPS 402C has a remaining run time of 10 minutes. The monitoring system is configured with UPS unit technical data that relates electrical load, battery capacity and remaining run time. The monitoring system 100 can estimate the battery capacity of UPS units 402A and 402B after all three units have run for 10 minutes and UPS 402C has exhausted its battery capacity. The monitoring system assumes the critical power load remains at 150 kW and uses the UPS unit technical data to estimate the remaining run time of units 402A and 402B now that they each carry 75 kW of the total 150 kW critical load. As noted above, the monitoring system can iteratively repeat this process for remaining UPS units until all capacity of the parallel combination of units is exhausted, or until the maximum power output of remaining unit(s) is no longer sufficient to carry the critical load. Alternately, the monitoring system may halt this iterative approach once the remaining UPS units can no longer support a specified level of redundancy.

The monitoring system can take the relationship between run time capacity and level of redundancy into consideration when defining and reporting transfer performance indicators. Parameter values acquired in real time can be compared with configured transfer performance indicator values to generate transfer performance assessments in real time. Further, the monitoring system can also draw upon historical data to predict points in time in the future when transfer performance indicator values may be exceeded.

Figure 6A:
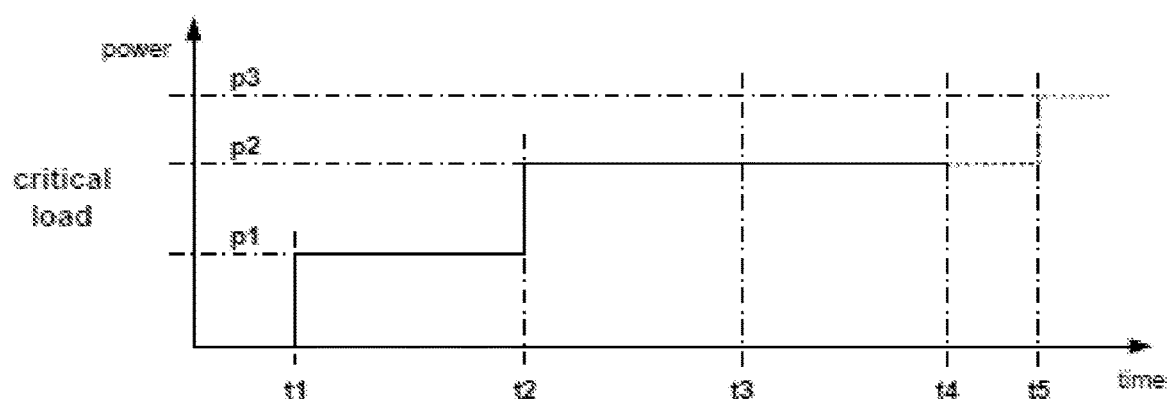
FIG. 6A is a graph of one example of a relationship between power demand versus time for parallel UPS systems.
Figure 6B:
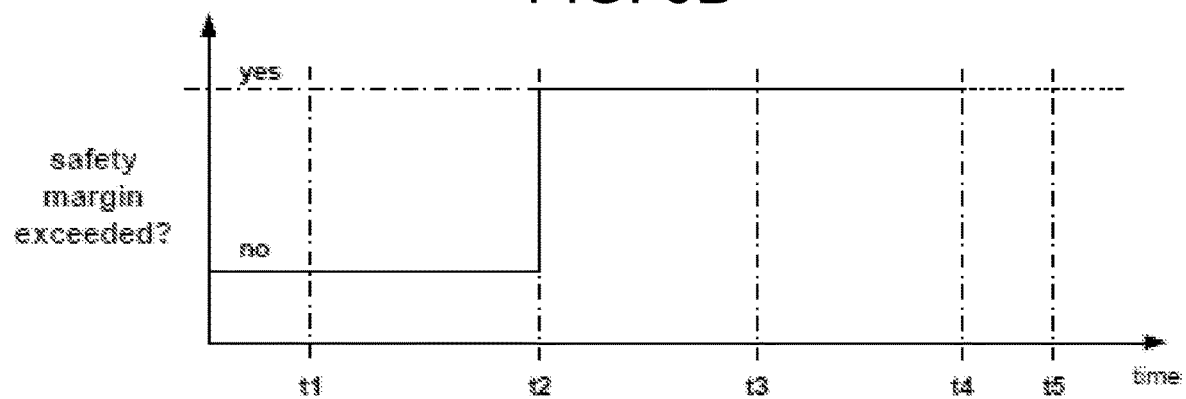
FIG. 6B is a graph of one example of a relationship between safety margin versus time for parallel UPS systems.
Figure 6C:
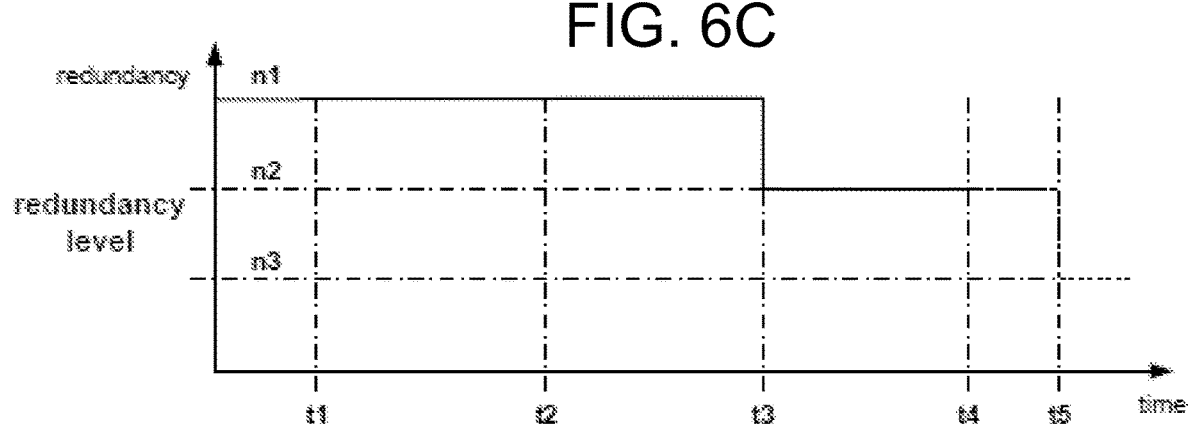
FIG. 6C is a graph of one example of a relationship between a redundancy level versus time for parallel UPS systems.

FIGS. 6A-6C provide an illustration of transfer performance indicator changes over time in response to changes in critical load and bridging energy source availability. FIG. 6A illustrates the performance of the critical load represented with power demands p1-p3 over time as determined by the monitoring system 100. FIG. 6B illustrates the safety margin as determined by the monitoring system 100 over time. FIG. 6C illustrates the redundancy level as determined by the monitoring system 100 over time. FIGS. 6A-C have the same time base, with time t4 representing the current time, with earlier times t1-t3 representing past events, and time t5 representing a future event. Trend lines in FIGS. 6A-C are solid in the past and up to the current time t4, and dashed when moving into the future past time t4.

At time t1, FIG. 6A shows the bridging energy source taking on a critical load having a power demand of p1. At this point, the bridging energy source can provide a remaining run time greater than the transfer time safety margin configuration of the monitoring system. At time t1, FIG. 6B shows an indication that the safety margin has not been exceeded. The bridging energy source is continuing to provide a redundancy level of n1 at time t1, as shown in the corresponding FIG. 6C. For a parallel UPS configuration, for example, redundancy level n1 may be a level of N+2 if only two of four UPS units are required.

At time t2, the power demand of the critical load increases to p2 as shown in FIG. 6A. Accordingly, FIG. 6B shows that the safety margin setting in the monitoring system has been exceeded. However, redundancy level for the system remains at n1 as shown in FIG. 6C. At time t3, a component of the bridging energy source fails and FIG. 6C shows a drop down to redundancy level n2. In the parallel UPS configuration described above with reference to FIG. 4, the failure of the bridging energy source may represent the loss of one of the three UPS units 402, and with two units required to provide the critical power demand, this might represent a reduction in redundancy to N+1. At time t3, the critical power demand remains at p2 and the transfer time safety margin continues to be exceeded, as shown in FIGS. 6A and 6B.

In addition to providing an update of transfer performance indicators in real time as new measurement parameters are received, the monitoring system 100 can also use models of historical data to forecast potential changes in transfer performance indicators. In reference to FIGS. 6A-C, the projected potential changes can be represented in dashed lines after present time t4. The monitoring system 100 may, for example, contain a model of critical load power demand versus one or more predictor variables. Examples of predictor variables may include scheduled operating room activity and historical trends for computing load in a data center, for example projected environmental factors as well as other predictor variables.

Models may also be constructed of the bridging energy source storage capacity versus critical load demand, and future measurements of storage capacity during a transfer compared against the predicted storage capacity. Changes over time in the measured versus predicted storage capacity may indicate that components (such as batteries) within the bridging energy source require maintenance, causing the monitoring system 100 to generate a notification for a maintenance check.

FIG. 6A illustrates one example of the monitoring system 100 predicting that the critical load power demand can rise to p3 at future time t5. As the result of the added demand, FIG. 6B shows that the monitoring system 100 predicts that the transfer time safety margin can continue to be exceeded. Accordingly, FIG. 6C shows that this predicted increase in critical load power demand can reduce the bridging energy source redundancy to level n3. In the example of FIG. 4, all three units are required to meet the increased critical load power demand, resulting in a redundancy level of N.

The ability to create models of facility power demand over time versus one or more predictors yields increased flexibility in facility operations while maintaining desired values of transfer performance indicators. Rather than depending on rules of thumb and assumptions of current and future power demand levels, facility staff can use models for power demand versus key predictors to adjust facility operations to be close to (but not exceed) defined transfer performance indicators.

As an example, consider a data center in which only computing and communications equipment are classified as critical loads, and air conditioning equipment is classified as a non-critical load. During a power transfer only critical loads are carried by the bridging energy source, so to ensure a safe internal temperature for critical equipment the internal temperature is kept at an arbitrarily low level. One or more models may be built that show the relationship between outdoor temperature, critical equipment power demand and the rise in internal temperature in response to increases in critical equipment power demand. Given these models and the desired safety margin in performing a transfer between primary and backup energy sources, it may be possible to relax the internal temperature setting to a higher temperature while still maintaining the desired transfer time safety margin.

Computer System

Various aspects and functions described herein, such as the monitoring system 100 and the local server 120 described above with reference to FIG. 1, in accordance with the present embodiments may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects in accordance with the present embodiments may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the embodiments are not limited to executing on any particular system or group of systems. Further, aspects may be implemented in software, hardware or firmware, or any combination thereof. Thus, aspects in accordance with the present embodiments may be implemented within methods, acts, systems, system elements and components using a variety of hardware and software configurations, and the embodiments are not limited to any particular distributed architecture, network, or communication protocol.

Figure 7:
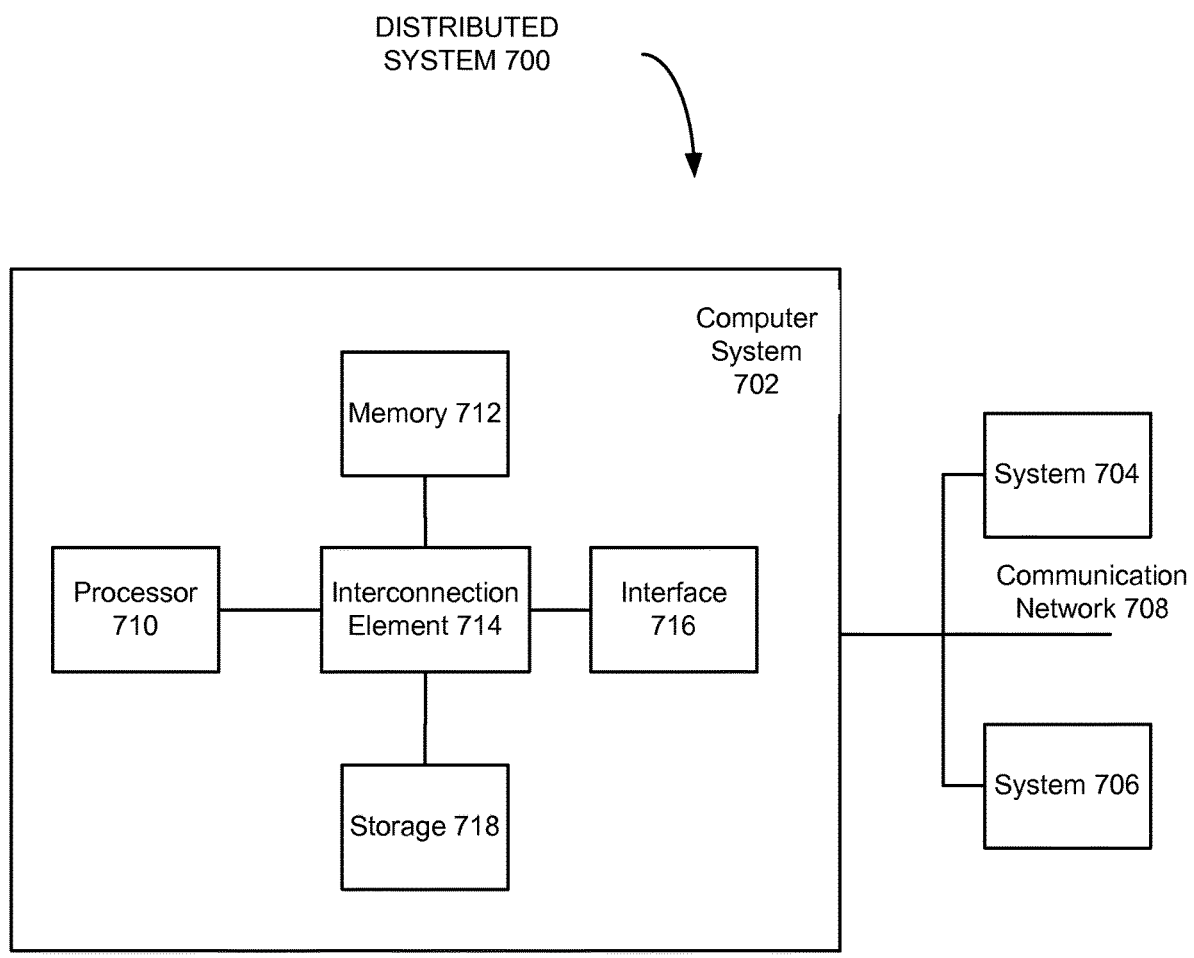
FIG. 7 is a block diagram of one example of a computer system with which various aspects in accord with various embodiments may be implemented.

FIG. 7 shows a block diagram of a distributed computer system 700, in which various aspects and functions in accord with the present embodiments may be practiced. The distributed computer system 700 may include one more computer systems. For example, as illustrated, distributed computer system 700 includes computer systems 702, 704 and 706. As shown, computer systems 702, 704 and 706 are interconnected by, and may exchange data through, communication network 168. The network 708 may include any communication network through which computer systems may exchange data. To exchange data using the network 708, the computer systems 702, 704 and 706 and the network 708 may use various methods, protocols and standards, including, among others, token ring, Ethernet, wireless Ethernet, Bluetooth, TCP/IP, UDP, Http, FTP, SNMP, SMS, MMS, SS7, Json, Soap, and Corba. To ensure data transfer is secure, the computer systems 702, 704 and 706 may transmit data via network 708 using a variety of security measures including TLS, SSL or VPN among other security techniques. While distributed computer system 700 illustrates three networked computer systems, the distributed computer system 700 may include any number of computer systems and computing devices, networked using any medium and communication protocol.

Various aspects and functions in accordance with the present embodiments may be implemented as specialized hardware or software executing in one or more computer systems including the computer system 702 shown in FIG. 7. As depicted, the computer system 702 includes a processor 710, a memory 712, an interconnection element 714, an interface 716 and a storage system 718. The processor 710 may perform a series of instructions that result in manipulated data. The processor 710 may be a commercially available processor such as an Intel Pentium, Motorola PowerPC, SGI MIPS, Sun UltraSPARC, or Hewlett-Packard PA-RISC processor, but may be any type of processor, multi-processor, microprocessor or controller as many other processors and controllers are available. The processor 710 is connected to other system elements, including one or more memory devices 712, by the interconnection element 714.

Memory 712 may be used for storing programs and data during operation of computer system 702. Thus, memory 712 may be a relatively high performance, volatile, random access memory such as a dynamic random access memory (DRAM) or static memory (SRAM). However, memory 712 may include any device for storing data, such as a disk drive or other non-volatile, non-transitory, storage device. Various embodiments in accordance with the present invention may organize memory 712 into particularized and, in some cases, unique structures to perform the aspects and functions disclosed herein.

Components of the computer system 702 may be coupled by an interconnection element such as the interconnection element 714. The interconnection element 714 may include one or more physical busses, for example, busses between components that are integrated within a same machine, but may include any communication coupling between system elements including specialized or standard computing bus technologies such as IDE, SCSI, PCI and InfiniBand. Thus, the interconnection element 714 enables communications, for example, data and instructions, to be exchanged between system components of the computer system 702.

The computer system 702 also includes one or more interface devices 716 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 702 to exchange information and communicate with external entities, such as users and other systems.

The storage system 718 may include a computer readable and writeable, nonvolatile, non-transitory, storage medium in which instructions are stored that define a program to be executed by the processor. The storage system 718 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor or some other controller may cause data to be read from the nonvolatile recording medium into another memory, such as the memory 712, that allows for faster access to the information by the processor than does the storage medium included in storage system 718. The memory may be located in the storage system 718 or in the memory 712, however, the processor 710 may manipulate the data within the memory 712, and then may copy the data to the medium associated with the storage system 718 after processing is completed. A variety of components may manage data movement between the medium and integrated circuit memory element and the presently described embodiments are not limited thereto. Further, the embodiments are not limited to a particular memory system or data storage system.

Although the computer system 702 is shown by way of example as one type of computer system upon which various aspects and functions in accordance with the present embodiments may be practiced, any aspects of the presently disclosed embodiments are not limited to being implemented on the computer system as shown in FIG. 7. Various aspects and functions in accord with the presently disclosed embodiments may be practiced on one or more computers having a different architectures or components than that shown in FIG. 7. For instance, the computer system 702 may include specially-programmed, special-purpose hardware, such as for example, an application-specific integrated circuit (ASIC) tailored to perform a particular operation disclosed herein. While another embodiment may perform the same function using several general-purpose computing devices running MAC OS X with 32-bit Intel and 64-bit Intel processors and several specialized computing devices running proprietary hardware and operating systems.

The computer system 702 may be a computer system including an operating system that manages at least a portion of the hardware elements included in the computer system 702. Usually, a processor or controller, such as processor 710, executes an operating system which may be, for example, a Windows-based operating system, such as, Windows NT, Windows 2000 (Windows ME), Windows XP, Windows Vista, Windows 7, and Windows 8 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C-, bytecode or interpreted code which communicates over a communication network, for example, the Internet, using a communication protocol, for example, TCP/IP. Similarly, aspects in accord with the presently disclosed embodiments may be implemented using an object-oriented programming language, such as .Net, SmallTalk, Java, C++, Ada, or C # (C-Sharp). Other object-oriented programming languages may also be used. Alternatively, functional, scripting, or logical programming languages may be used.

Additionally, various aspects and functions in accordance with the presently disclosed embodiments may be implemented in a non-programmed environment, for example, documents created in HTML, XML or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the presently disclosed embodiments are not limited to a specific programming language and any suitable programming language could also be used.

A computer system included within an embodiment may perform additional functions outside the scope of the presently disclosed embodiments. For instance, aspects of the system may be implemented using an existing commercial product, such as, for example, Database Management Systems such as SQL Server available from Microsoft of Seattle, Wash., Oracle Database from Oracle of Redwood Shores, Calif., and MySQL from MySQL AB, a subsidiary of Oracle or integration software such as Web Sphere middleware from IBM of Armonk, N.Y. However, a computer system running, for example, SQL Server may be able to support both aspects in accord with the presently disclosed embodiments and databases for sundry applications.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of controlling transfer of critical and/or non-critical loads from a first energy source coupled to a monitoring system to a second energy source, the method comprising:
   capturing first transfer parameter values of the first energy source, the second energy source, and a bridging energy source during at least a first transfer of the critical and/or non-critical loads from the first energy source to the second energy source;
   defining, at the first device, at least one transfer performance indicator based on the captured first transfer parameter values;
   capturing second transfer parameter values of the first energy source, the second energy source, and the bridging energy source during at least a second transfer of the critical and/or non-critical loads from the first energy source to the second energy source;
   comparing the captured second transfer parameter values to the defined at least one transfer performance indicator, the comparison being used to identify critical and/or non-critical loads for transfer; and
   controlling transfer of the identified critical and/or non-critical loads from the first energy source to the bridging energy source and from the bridging energy source to the second energy source based on the comparison.

2. The method of claim 1, wherein the first transfer parameter values include at least one of:
   a current energy capacity value of the first energy source, the second energy source, and/or the bridging energy source, an operational status value of the first energy source, the second energy source, the bridging energy source, and/or the critical and/or non-critical loads, a remaining run time value of the bridging energy source, a total transfer time value for transfer of the critical and/or non-critical loads, a power draw value of the critical and/or non-critical loads, an electrical value, a historical record of past values of the first energy source, the second energy source, and/or the bridging energy source, and technical specification values.

3. The method of claim 1, wherein the at least one defined transfer performance indicator includes at least one of: an acceptable range of bridging energy source remaining runtime, a total time required to transfer the critical and/or non-critical loads from the first energy source to the second energy source, a remaining run-time of the bridging energy source after a completed transfer of the critical and/or non-critical loads from the first energy source to the second energy source, nominal values of technical specification values for the first energy source, the second energy source, the bridging energy source, and/or the critical and/or non-critical loads, summary values calculated based on the captured first transfer parameter values, nominal run times of the bridging energy source during transfer of different critical and/or non-critical loads, and historical measured performance values of the first energy source, the second energy source, and/or the bridging energy source.

4. The method of claim 3, further comprising:
tracking at least the first transfer, at least the second transfer, and/or other transfers of the critical and/or non-critical loads from the first energy source to the second energy source; and
applying at least one start criteria and at least one stop criteria to the tracked first transfer, second transfer, and/or other transfers, the at least one start criteria and the at least one stop criteria being configured to perform a test on the first energy source, the second energy source, and/or the bridging energy source.

5. The method of claim 4, further comprising:
transmitting a begin test signal to start testing on the first energy source, the second energy source, and/or the bridging energy source; and
transmitting an end test signal to end testing on the first energy source, the second energy source, and/or the bridging energy source.

6. The method of claim 1, wherein the at least one defined transfer performance indicator includes a total time required to transfer the critical and/or non-critical loads from the first energy source to the second energy source.

7. The method of claim 1, wherein the at least one defined transfer performance indicator includes a total time required to transfer the critical and/or non-critical loads from the first energy source to the second energy source.

8. A system for controlling transfer of critical and/or non-critical loads from a first energy source to a second energy source, the system comprising:
a control unit configured to:
capture first transfer parameter values of the first energy source, the second energy source, and a bridging energy source during at least a first transfer of the critical and/or non-critical loads from the first energy source to the second energy source define at least one transfer performance indicator based on the captured first transfer parameter values;
capture second transfer parameter values of the first energy source, the second energy source, and the bridging energy source during at least a second transfer of the critical and/or non-critical loads from the first energy source to the second energy source;
compare the captured second transfer parameter values to the defined at least one transfer performance indicator, the comparison being used to identify critical and/or non-critical loads for transfer; and
control transfer of the identified critical and/or non-critical loads from the first energy source to the bridging energy source and from the bridging energy source to the second energy source based on the comparison.

9. The system of claim 8, wherein the first transfer parameter values include at least one of: a current energy capacity value of the first energy source, the second energy source, and/or the bridging energy source, an operational status value of the first energy source, the second energy source, the bridging energy source, and/or the critical and/or non-critical loads, a remaining run time value of the bridging energy source, a total transfer time value for transfer of the critical and/or non-critical loads from the first energy source to the second energy source, a safety margin time value, recharge time value, a power draw value of the critical and/or non-critical loads, an electrical value, a historical record of past values of the first energy source, the second energy source, and/or the bridging energy source, and technical specification values.

10. The system of claim 8, wherein the at least one defined transfer performance indicator includes at least one of: an acceptable range of bridging energy source remaining run-time, a total time required to transfer the critical and/or non-critical loads from the first energy source to the second energy source, a remaining run-time of the bridging energy source after a completed transfer of the critical and/or non-critical loads from the first energy source to the second energy source, nominal values of technical specification values for the first energy source, the second energy source, the bridging energy source, and/or the critical and/or non-critical loads, summary values calculated based on the captured first transfer parameter values, nominal run times of the bridging energy source during transfer of different critical and/or non-critical loads, and historical measured performance values of the first energy source, the second energy source, and/or the bridging energy source.

11. The system of claim 8, wherein the control unit is further configured to:
track at least the first transfer, at least the second transfer, and/or other transfers of the critical and/or non-critical loads from the first energy source to the second energy source; and
apply at least one start criteria and at least one stop criteria to the tracked first transfer, second transfer, and/or other transfers, the at least one start criteria and the at least one stop criteria being configured to perform a test on the first energy source, the second energy source, and/or the bridging energy source.

12. The system of claim 11, wherein the control unit is further configured to:
transmit a begin test signal to start the test on the first energy source, the second energy source, and/or the bridging energy source; and
transmit an end test signal to end the test on the first energy source, the second energy source, and/or the bridging energy source.

* * * * *